United States Patent [19]

Johnson, Sr.

[11] Patent Number: 4,971,704

[45] Date of Patent: Nov. 20, 1990

[54] SYSTEM FOR PURIFYING ENGINE LUBRICATING OIL

[75] Inventor: Lester L. Johnson, Sr., Jacksonville, Fla.

[73] Assignee: Electrolube Devices, Inc., Jacksonville, Fla.

[21] Appl. No.: 402,667

[22] Filed: Sep. 5, 1989

[51] Int. Cl.⁵ ..................... B01D 35/18; B01D 36/00
[52] U.S. Cl. .................... 210/741; 210/774; 210/805; 210/806; 210/807; 210/117; 210/137; 210/168; 210/175; 210/180; 210/182; 210/186; 210/253; 210/257.1; 210/258; 210/295; 210/416.5; 210/436; 184/6.24; 123/196 A
[58] Field of Search ............. 210/117, 136, 137, 168, 210/175, 180, 182–184, 186, 253, 257.1, 258, 295, 416.5, 436, 472, 741, 742, 774, 790, 805, 806, 808; 184/6.22, 6.24; 123/196 A; 208/179, 186

[56] References Cited

U.S. PATENT DOCUMENTS

| | | | |
|---|---|---|---|
| Re. 17,644 | 4/1930 | Manning | 210/168 |
| 1,816,573 | 7/1931 | Ellis et al. | 210/168 |
| 2,322,722 | 6/1943 | Pennebaker | 123/196 A |
| 2,324,763 | 7/1943 | Carruthers | 210/806 |
| 4,272,371 | 6/1981 | Moses et al. | 210/436 |
| 4,338,189 | 7/1982 | Johnson, Sr. | 210/184 |
| 4,354,946 | 10/1982 | Warlick et al. | 210/168 |
| 4,522,166 | 6/1985 | Toivio et al. | 123/196 A |
| 4,758,338 | 7/1988 | Johnson, Sr. | 210/168 |
| 4,830,745 | 5/1989 | vander Meulen | 210/180 |

Primary Examiner—W. Gary Jones
Assistant Examiner—Matthew O. Savage
Attorney, Agent, or Firm—Arthur G. Yeager

[57] ABSTRACT

Engine lubricating oil is removed from the engine sump, passed through a strainer and pumped at superatmospheric pressure through a heater to raise the temperature to 150°–180° F., a portion of the heated pressurized oil is passed through a filter and to the oil sending unit of the engine while the remainder of the heated pressurized oil is refined by filtering to remove particles above 5 microns and to vaporize and remove vaporizable contaminants; the refined oil being returned at atmospheric pressure by gravity to the engine sump.

10 Claims, 1 Drawing Sheet

SYSTEM FOR PURIFYING ENGINE LUBRICATING OIL

BACKGROUND OF THE INVENTION

Lubricating oil in internal combustion engines becomes contaminated in use. Dirt and dust accumulate in the oil from its contact with the atmosphere. Sludge is formed in the oil because of the high temperature and high pressure on the oil in the engine. In addition the oil undergoes chemical changes by reason of oxidation and the combustion products of the engine fuel. These chemical and physical changes continue and will gradually break down the oil to a useless composition for lubricating the engine, necessitating a complete replacement of the used lubricating oil with new oil. Many attempts have been made to prolong the useful life of lubricating oil by means of filters. Such procedures are successful but they normally are useful only in removing large particles of metal, dirt, or sludge; while smaller contaminants and chemical reaction products are unchanged. Thus the life of the lubricating oil is extended but not by as much as is desired.

It is an object of this invention to provide an improved system for treating and rejuvenating lubricating oil. It is another object of this invention to provide a novel system for purifying and preparing lubricating oil for use in an internal combustion engine. Still other objects will become apparent from the more detailed description which follows.

BRIEF SUMMARY OF THE INVENTION

This invention relates to a system for purification and preparation of lubricating oil in an internal combustion engine comprising (1) passing oil from the engine sump through a strainer for removal of large particles therefrom; (2) passing oil from the strainer through a pump; (3) pumping the oil through a heater to raise the temperature to 150°–180° F.; (4) passing a portion of the heated oil through a filter and into the oil sending unit of the engine; and (5) passing the remainder of the heated oil to a refiner which filters out small particles from the oil, vaporizes the vaporizable contaminants in a chamber heated to about 180°–210° F., expels the vaporized contaminants, and returns refined oil to the engine sump.

In specific embodiments of the invention the system incorporates a strainer for removing particles of larger than 165 microns, a refiner to remove particles larger than 5 microns and vaporizable components, and a filter to remove particles in the hot pressurized oil going to the engine sending unit.

BRIEF DESCRIPTION OF THE DRAWINGS

The novel features which are believed to be characteristic of this invention are set forth with particularity in the appended claims. The invention itself, however, both as to its organization and method of operation, together with further object and advantages thereof, may best be understood by reference to the following description taken in connection with the accompanying drawings in which:

DETAILED DESCRIPTION OF THE INVENTION

Figure 1:
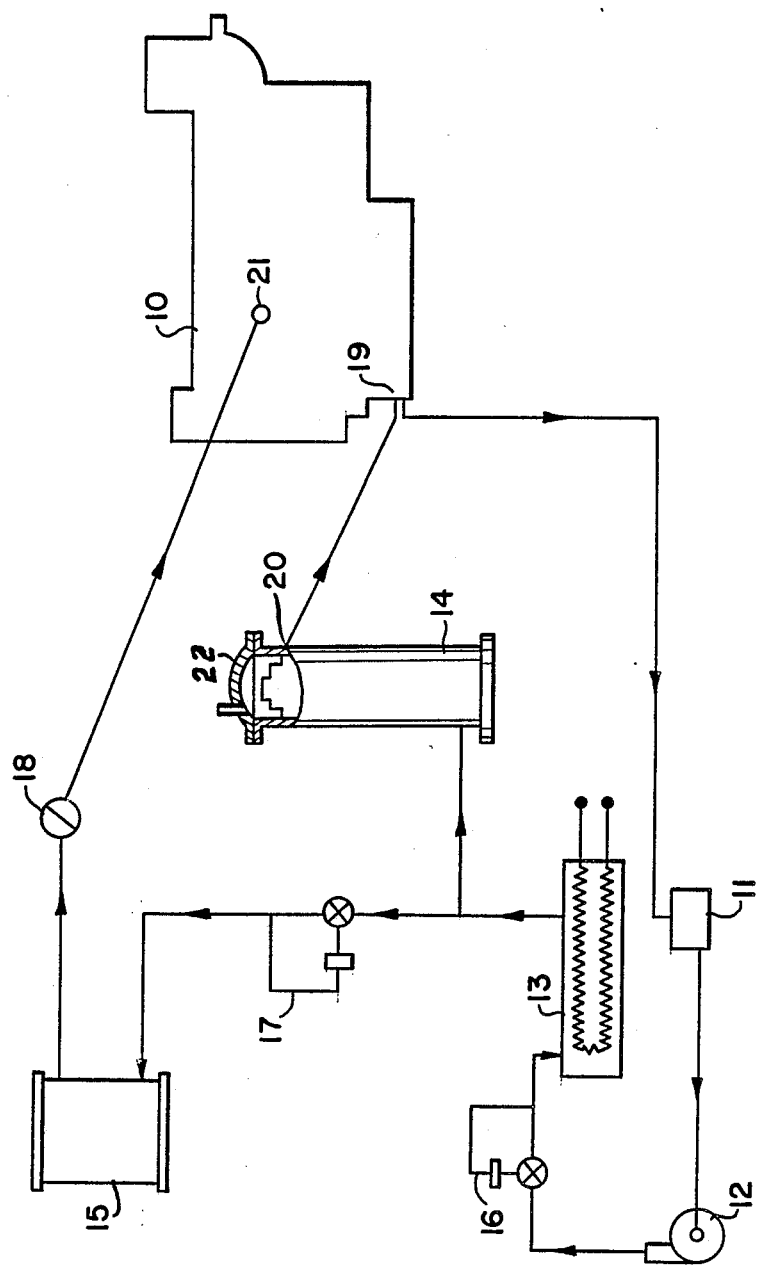
FIG. 1 is a process flow sheet showing the various components of the system of this invention.

The system of this invention is best understood by reference to the attached drawing which illustrates how this system is applied to a diesel engine or other internal combustion engine. The engine 10 has all the usual internal passageways for lubricating oil to be conducted to lubricate bearings, bushings, and other moving parts. The oil is propelled through these passageways by a sending unit 21 which is a pump or other pressurizing means to push the oil through the passageways to a collection sump 19. This invention provides a system for treating the oil in sump 19 before it is returned to sending unit 21 for recycling through engine 10.

Oil from sump 19 is drawn by the suction side of pump 12 through a strainer 11, about 100 mesh, to remove large particles, e.g., at least about 165 microns. Such particles may be metal shavings, sludge, dirt, or the like. Strainer 11 may be a wire basket or other type which can be readily cleaned or replaced when sufficiently filled with particles to cause a substantial flow impairment to the oil passing therethrough. Pump 12 is any suitable type of pump which will deliver the oil at a pressure of about 60 psi.

Preferably a pressure regulating valve 16 is placed downstream of pump 12 to reduce the pressure of the flowing stream of oil to a steady level of about 40 psi. The oil is then passed through a heater 13 which heats the oil to a temperature of 150°–180° F. The principal purpose of raising the temperature is to provide a supply of hot oil to the engine during start-up periods. Without having the oil at such a temperature, a start-up of the engine frequently produces damage to engine components which are not suitably lubricated until the engine reaches operating temperature and thereby brings the oil up to proper operating temperature. Any suitable type of heater is appropriate for heater 13. Electrical heater coils are preferred.

Oil leaving heater 13 is then divided into two streams one of which passes through a pressure regulating valve 17, a filter 15, and check valve 18 to the engine sending unit 21 in the oil gallery of the engine. Pressure regulating valve 17 is preferably set at about 30 psi, to provide the appropriate pressure for filter 15 which removes particles from the hot oil. Filter 15 preferably removes particles of larger than about 5 microns. Check valve 18 is employed to prevent the development of any back pressure when engine 10 is running.

The other stream of oil leaving heater 13 passes through refiner 14 which purifies the oil. Refiner 14 is designed to remove particles of greater than 5 microns size and to remove vaporizable contaminants. Refiner 14 is substantially that disclosed and claimed in my U.S. Pat. No. 4,758,338. Particles are removed by means of a filter component. Vaporizable components, e.g., water, heavy petroleum products, etc., are removed by cascading the oil adjacent to the lid 22 of refiner 14 heated to about 180°–210° F., and bleeding off the vaporized components to the atmosphere. The resulting product is a hot oil at substantially atmospheric pressure that must be returned to sump 19. Preferably refiner's return line 20 is placed at an elevation above sump 19 and the hot oil from refiner 14 flows by gravity from exit 20 to sump 19.

Of course, suitable pressure indicators may be placed in line at appropriate places, like between sump 19 and strainer 11; between filter 15 and back pressure valve 18; and between heater 13 and refiner 14.

The system of this invention is most useful for large engines such as those employed in boats and ships and those employed in large land vehicles. Diesel engines are frequently employed in such uses and the system of this invention preferably is incorporated with such an engine.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A process for purification and preparation of lubricating oil in an internal combustion engine comprising (1) passing oil from the engine sump through a strainer for removal of large particles therefrom; (2) passing oil from the strainer through a pump; (3) pumping the oil through a heater to raise the temperature to 150°-180° F.; (4) passing a portion of the heated oil through a filter and into the oil sending unit of the engine; and (5) passing the remainder of the heated oil to a refiner which filters out small particles from the oil vaporizing the vaporizable contaminants in a chamber heated to about 180°-210° F., expelling the vaporized contaminants, and returning refined oil to the engine sump.

2. The process of claim 1 wherein said pump pressurizes the oil to 40-60 psi.

3. The process of claim 1 wherein the refined oil leaving said refiner is at substantially atmospheric pressure and flows by gravity to said sump.

4. The process of claim 1 which additionally comprises passing said oil through a check valve between said filter and said sending unit.

5. The process of claim 1 which additionally comprises means to regulate the pressure of the oil at a predetermined level while passing between said pump and said oil sending unit.

6. The process of claim 1 wherein said refiner filters particles from the oil having a size of at least 5 microns.

7. A system for continuously purifying and preparing lubricating oil for use in an internal combustion engine having a sending unit for distributing lubricating oil to components of said engine requiring lubricating oil and a sump for the collection of used lubricating oil, said system comprising:

(1) an oil pump receiving oil from said sump at subatmospheric pressure and delivering oil at a superatmospheric pressure;

(2) a strainer through which said oil passes in proceeding from said sump to said pump, said strainer being adapted to filter from said oil passing therethrough particles of at least about 165 microns in size;

(3) a heater adapted to receive pressurized oil from said pump and deliver said oil heated to a temperature of about 150°-180° F. and at substantially the same pressure as that of the oil entering said heater;

(4) a refiner adapted to receive a portion of said oil leaving said heater, including means for filtering out particles of more than about 5 microns in size, means for vaporizing the vaporizable contaminants in the oil by passing the oil through a chamber heated to a temperature of about 180°-210° F., means for venting to the atmosphere the contaminants vaporized thereby, and means for returning oil from the refiner to said sump;

(5) a pressure filter adapted to receive a portion of said oil leaving said heater and including means for filtering particles therefrom of a size in excess of about 5 microns and adapted to deliver filtered pressurized and heated oil to said sending unit.

8. The system of claim 7 which additionally comprises a pressure regulating system to maintain the pressure of oil between said pump and its return to said sending unit at a selected pressure.

9. The system of claim 7 which additionally comprises a check valve means between said pressure filter and said sending unit to prevent back flow of oil toward said pressure filter.

10. The system of claim 7 wherein oil exiting said refiner is at substantially atmospheric pressure and is conducted to said sump by gravity flow.

* * * * *